United States Patent
Bhatia et al.

(10) Patent No.: US 9,367,419 B2
(45) Date of Patent: *Jun. 14, 2016

(54) IMPLEMENTATION ON BASEBOARD MANAGEMENT CONTROLLER OF SINGLE OUT-OF-BAND COMMUNICATION ACCESS TO MULTIPLE MANAGED COMPUTER NODES

(71) Applicant: American Megatrends, Inc., Norcross, GA (US)

(72) Inventors: Anurag Bhatia, Lilburn, GA (US); Winston Thangapandian, Duluth, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 646 days.

This patent is subject to a terminal disclaimer.

(21) Appl. No.: 13/736,150

(22) Filed: Jan. 8, 2013

(65) Prior Publication Data
US 2014/0195657 A1    Jul. 10, 2014

(51) Int. Cl.
*G06F 15/16* (2006.01)
*G06F 15/173* (2006.01)
*G06F 11/30* (2006.01)
*H04L 12/26* (2006.01)
(Continued)

(52) U.S. Cl.
CPC ........ *G06F 11/3055* (2013.01); *G06F 11/3058* (2013.01); *H04L 43/0817* (2013.01); *H04L 61/2038* (2013.01); *H04L 41/04* (2013.01)

(58) Field of Classification Search
CPC . G06F 11/3055; G06F 11/3058; H04L 41/04; H04L 61/2038; H04L 43/0817

USPC .......................................................... 709/223
See application file for complete search history.

(56) References Cited

U.S. PATENT DOCUMENTS

| 7,395,323 B2 | 7/2008 | Larson et al. |
| 7,673,290 B1 | 3/2010 | Kothandapani et al. |
| 7,694,298 B2 | 4/2010 | Goud et al. |

(Continued)

FOREIGN PATENT DOCUMENTS

WO    2006063276 A1    6/2006

OTHER PUBLICATIONS

"—IPMI—Intelligent Platform Management Interface Specification Second Generation v2.0"—Intel et al.; Feb. 12, 2004 available online www.intel.com/content/www/us/en/servers/ipmi/second-gen-interface-spec-v2-rev1-4.html.*

(Continued)

*Primary Examiner* — David Lazaro
*Assistant Examiner* — Xiang Yu
(74) *Attorney, Agent, or Firm* — Locke Lord LLP; Tim Tingkang Xia, Esq.

(57) ABSTRACT

Certain aspects of the present disclosure are directed to a baseboard management controller (BMC). The BMC includes: a processor; a network interface controller assigned with a network address; and a memory having firmware. The firmware is configured to be, when executed at the processor, in communication with a plurality of computer nodes, and to receive, through the same network interface controller, management requests each for performing a management operation at one of the plurality of computer nodes and addressed to the same network address, the management requests being directed to at least two of the plurality of computer nodes.

19 Claims, 5 Drawing Sheets

(51) Int. Cl.
*H04L 29/12* (2006.01)
*H04L 12/24* (2006.01)

(56) References Cited

U.S. PATENT DOCUMENTS

| | | | |
|---|---|---|---|
| 7,788,363 B2 | 8/2010 | Sievert | |
| 8,150,953 B2 | 4/2012 | Mittapalli et al. | |
| 8,452,863 B2 | 5/2013 | Lai et al. | |
| 8,549,127 B2 | 10/2013 | Chhuor et al. | |
| 8,762,696 B2 | 6/2014 | Bhatia et al. | |
| 2004/0249913 A1 | 12/2004 | Kaufman, Jr. | |
| 2006/0184349 A1 | 8/2006 | Goud et al. | |
| 2006/0218326 A1* | 9/2006 | Tanaka | H05K 7/1459 710/104 |
| 2007/0038732 A1 | 2/2007 | Chandwani et al. | |
| 2009/0249319 A1 | 10/2009 | Bai et al. | |
| 2010/0014514 A1 | 1/2010 | Sievert | |
| 2010/0205600 A1 | 8/2010 | Tu et al. | |
| 2010/0306357 A1 | 12/2010 | Chen | |
| 2011/0029652 A1 | 2/2011 | Chhuor et al. | |
| 2011/0153899 A1 | 6/2011 | Aldereguia et al. | |
| 2012/0023210 A1* | 1/2012 | Lai | G06F 9/46 709/223 |
| 2012/0151475 A1 | 6/2012 | Bealkowski | |
| 2013/0054943 A1 | 2/2013 | Bhatia et al. | |
| 2013/0151841 A1 | 6/2013 | McGraw | |
| 2014/0032641 A1 | 1/2014 | Du | |
| 2014/0195704 A1 | 7/2014 | Bhatia et al. | |
| 2014/0280947 A1 | 9/2014 | Christopher et al. | |

OTHER PUBLICATIONS

"—IPMI—Intelligent Platform Management Interface Specifications Second Generation v2.0"—Intel et al.; Feb. 12, 2004 available online www.intel.com/content/www/us/en/servers/ipmi/second-gen-interface-spec-v2-rev1-4.html.*

Inaugural—Dissertation; CHARM-Card: Hardware Based Cluster Control and Management System; Submitted by Ralf Erich Panse; Experts: Prof. Dr. Volker Lindenstruth and Prof. Dr. Thomas Ludwig; Oct. 2009, pp. 1-159.

"—IPMI—Intelligent Platform Management Interface Specification Second Generation", Intel et al.; Version 2.0; Feb. 12, 2004; pp. i-26.

* cited by examiner

IMPLEMENTATION ON BASEBOARD MANAGEMENT CONTROLLER OF SINGLE OUT-OF-BAND COMMUNICATION ACCESS TO MULTIPLE MANAGED COMPUTER NODES

CROSS-REFERENCE TO RELATED APPLICATIONS

This application is related to copending U.S. patent application Ser. No. 13/736,120, filed Jan. 8, 2013, entitled "EMULATED COMMUNICATION BETWEEN MASTER MANAGEMENT INSTANCE AND ASSISTING MANAGEMENT INSTANCES ON BASEBOARD MANAGEMENT CONTROLLER," and copending U.S. patent application Ser. No. 13/736,233, filed Jan. 8, 2013, entitled "CHASSIS MANAGEMENT IMPLEMENTATION BY MANAGEMENT INSTANCE ON BASEBOARD MANAGEMENT CONTROLLER MANAGING MULTIPLE COMPUTER NODES," both of which are incorporated herein by reference in their entireties. The above-identified copending applications have the same assignee as this application and the same inventors as this application.

FIELD

The present disclosure generally relates to firmware of a Baseboard Management Controller for management control of computing platforms, and more particularly to implementation on a baseboard management controller of a single out-of-band communication access to multiple managed computer nodes.

BACKGROUND

Conventionally, multiple pieces of management hardware are required to manage computing functions of multiple computing platforms, where each management hardware device has a single instance of management firmware for a respective one of the computing platforms. There is an associated cost for each computing platform to be managed in a plurality of computing platforms, such as server platforms, because each managed computing platform requires a separate management hardware device. Accordingly, introducing an additional computing platform to be managed means incurring additional cost for the management hardware. The conventional method requires a large amount resources and a large amount cost associated with the resources.

Therefore, heretofore unaddressed needs still exist in the art to address the aforementioned deficiencies and inadequacies.

SUMMARY

Certain aspects of the present disclosure are directed to a baseboard management controller (BMC). The BMC includes: a processor, a network interface controller assigned with a network address, and a memory having firmware. The firmware is configured to be, when executed at the processor, in communication with a plurality of computer nodes, and to receive, through the same network interface controller, management requests each for performing a management operation at one of the plurality of computer nodes and addressed to the same network address, the management requests being directed to at least two of the plurality of computer nodes.

In certain embodiments, the firmware is configured to allow all out-of-band communication messages directed to the plurality of computer nodes to be addressed to the same network address and handled by the same network interface controller.

In certain embodiments, each of the management requests includes data for constructing a protocol message in accordance with a first communication protocol, the protocol message including a management command, the first communication protocol being capable of directing communication among the plurality of computer nodes.

In certain embodiments, each of the management requests is an IPMI message encapsulated in at least one network packet addressed to the network address. The firmware is configured to receive the network packet through the network interface controller and retrieve the IPMI message from the network packet.

In certain embodiments, the firmware is configured to determine a target computer node from the plurality of computer nodes based on a first protocol address in accordance with the first communication protocol and included in the protocol message.

In certain embodiments, the firmware is configured to associate each of the plurality of computer nodes with a respective protocol address in accordance with the first communication protocol, maintain a record of the association of the protocol addresses and the computer nodes, and determine the target computer node by examining the record with the first protocol address.

Certain aspects of the present disclosure are directed to a baseboard management controller (BMC) implemented method. The method includes executing, at a processor of the BMC, a program to be in communication with a plurality of computer nodes; and receiving, at the program and through a network interface controller of the BMC assigned with a network address, management requests each for performing a management operation at one of the plurality of computer nodes and addressed to the same network address. The management requests are directed to at least two of the plurality of computer nodes.

Certain aspects of the present disclosure are directed to a non-transitory computer storage medium having computer-executable instructions stored thereon which, when executed by a processor of a baseboard management controller (BMC), cause the processor to execute a program to be in communication with a plurality of computer nodes; and to receive, through a network interface controller of the BMC and assigned with a network address, management requests each for performing a management operation at one of the plurality of computer nodes and addressed to the same network address. The management requests are directed to at least two of the plurality of computer nodes.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The accompanying drawings illustrate one or more embodiments of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
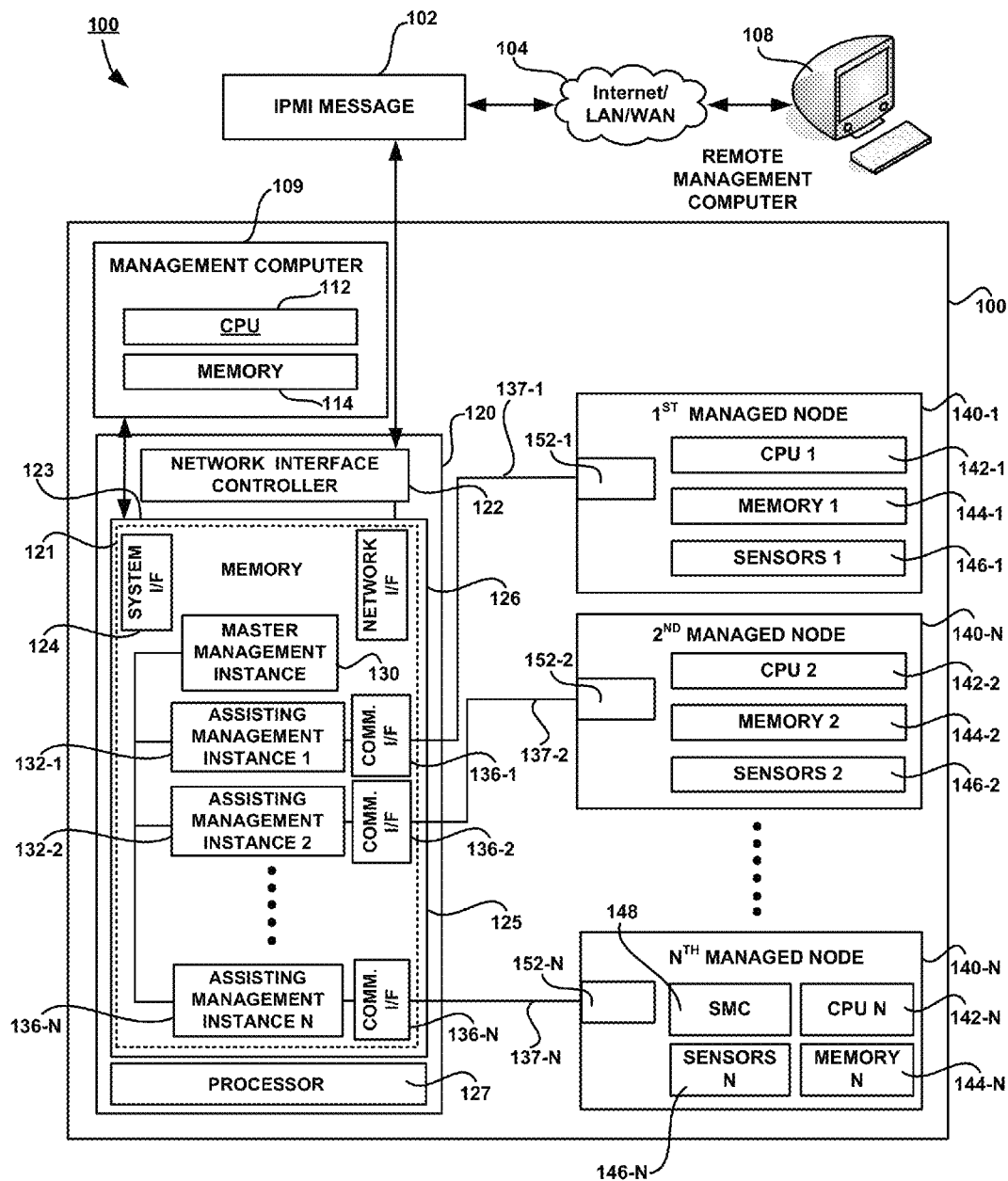
FIG. 1 schematically shows a computer management system having a management device and a plurality of managed computer nodes according to one embodiment of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

Referring to FIG. 1, a conceptual illustration of a computer management system 100 is shown according to one embodiment of the present disclosure. The computer management system 100 includes a management device 120, and managed computer nodes 140-1, 140-2, . . . , and 140-N. In certain embodiments, the management device 120 can be a Baseboard Management Controller (BMC), and the computer nodes can be computer boards or blade servers plugged onto a back plane in a chassis. The management device 120 communicatively connected to the managed computer nodes 140-1, 140-2, . . . , and 140-N. The management device 120 may be a general purpose computer system. It should be appreciated that the management device 120 may alternatively be a "special purpose" computer system or a system that incorporates more than one interconnected system, such as a clientserver network. Indeed, the management device 120 of FIG. 1 only represents an exemplary embodiment of the present disclosure, and therefore, should not be considered to limit the disclosure in any manner. The BMC 120 will now be used in the description as an example of the management device 120. One skilled in the art would appreciate that other similar devices can be used in place of the BMC 120. The BMC 120 includes a processor 127, firmware 121 stored in memory 123, and network interface controller 122.

Intelligent Platform Management Interface ("IPMI") is an industry standard for system monitoring and event recovery. The IPMI specification provides a common message-based interface for accessing all of the manageable features in a compatible computer. IPMI includes a rich set of predefined commands for reading temperature, voltage, fan speed, chassis intrusion, and other parameters. System event logs, hardware watchdogs, and power control can also be accessed through IPMI. In this manner, IPMI defines protocols for accessing the various parameters collected by a BMC through an operating system or through an external connection, such as through a network or serial connection. Additional details regarding IPMI can be found in the IPMI Specification (Version 2.0), which is publicly available from INTEL CORPORATION, and which is incorporated herein by reference.

The BMC 120 can receive an external request such as an IPMI messages 102 through a network interface 126, which is in communication with the network interface controller 122, from a remote management computer 108 over a network 104. The network 104 can be the Internet, a local area network (LAN), or a wide area network (WAN). The BMC can also receive IPMI messages from a management computer 109, having a CPU 112 and memory 114, through a system interface 124. The IPMI message 102 may include, among other things: (1) the source IP/MAC address, (2) a session ID, (3) a sequence number, (4) a Responder's Address, (5) the Responder's Logic Unit Number (LUN), (6) a Requester's Address, (7) the Requester's LUN, (8) actual command CMD, e.g., Send Message, (9) a message Channel number, and (10) encapsulated data for IPMB request. The encapsulated data for IPMB request may include: (1) the Responder's Address, (2) the Responder's LUN, (3) the Requester's Address, (4) the Requester's LUN, (5) the command CMD, e.g., Get Sensor Reading, (6) the sensor number.

The firmware, when executed, can include a master management instance 130 and several assisting management instances, depending on the number of the managed computer nodes. In one example, the firmware also includes a message interface 124, 126, a master management instance 130, and first and second assisting management instances 132-1, 132-2. The message interface 124 can include any system interface defined by the IPMI, such as a system interface, i.e., keyboard controller style ("KCS") interface, a system management interface chip ("SMIC") interface, a block transfer ("BT") interface, and SMBus System Interface (SSIF). The message interface 126 can also include a network interface such as an IPMI LAN interface.

The first and second assisting management instances 132-1, 132-2 monitor at least one health or performance related aspect of first and second computer nodes 140-1, 140-2, respectively. The master management instance 130 receives an IPMI message from the message interface 124, 126. The IPMI message contains data for constructing an IPMB message. The data includes a first IPMB slave address. The master management instance identifies the first assisting management instance 132-1 from the assisting management instances 132-1, 132-2, . . . , 132-N based on the first IPMB slave address, and then transfers the data to the first assisting management instance 132-1.

The management instances 130, 132 can be software stacks that implement one or more IPMI or BMC management functions. In certain embodiments, when the firmware executed by the processor 127, the processor 127 initiates the master management instance 130 and one assisting management instance 132 for each one of the management computer nodes. In certain embodiments, an assisting management instance 132 has a message interface for communicating with a managed computer node or other devices or systems. The message interface can include the IPMB interface, the ICMB interface, the KCS interface, the SMIC interface, the Block Transfer (BT) interface, the IPMI LAN interface, the SMBus system interface, the IPMI serial/modem interface. In certain embodiments, each of the assisting management instances 132 is in communication with sensors of a managed computer node 140 through a communication link 137 such as a SMBus or an I²C bus. The assisting management instance 132 performs one or more IPMI management functions for the managed computer node 140-1, 140-2, . . . , 140-N. The assisting management instance 132 can implement all the BMC functions and thus eliminates the need for having a separate BMC installed for each of the managed computer nodes. Optionally, a managed computer nodes can have one Satellite Management Controller (SMC) to perform some of IPMI management functions instead. In certain embodiments, only the master management instance 130 is in communication with the network interface controller 122 through the network interface 126. The network interface controller 122 can have a single network address (e.g., IP address) and directs all IPMI messages over LAN addressed to that network address to the master management instance 130. If the remote management computer 108 wants to send an IPMI message to one of the assisting management instance 132, the remote management computer 108 can send a bridged command that is addressed to the network interface controller 122 to the master management instance 130. As will be discussed in detail below, the master management instance 130 can relay data contained in the message to the assisting management instance 132. In other words, communications between the remote management computer 108 and the master management instance 130 and the one or more assisting management instances 132 can be accomplished by using a single network interface controller having a single network address. In this example, there is no need to assign a network address to each of the assisting management instance 132.

The BMC 120 can utilize the network interface controller (NIC) 122 to receive IPMI messages from, and transmit IPMI messages to, the remote management computer 108. The BMC 120 includes one or more communication interfaces 136 such as management bus interfaces for communication with the managed computer nodes 140-1, 140-2, . . . , and 140-N through communication buses 137-1, 137-2, . . . , and 137-N. The communication buses 137-1, 137-2, . . . , and 137-N provide two-way communication path for the management device 120 and the IPMI devices of the managed computer nodes 140-1, 140-2, . . . , and 140-N. In certain embodiments, the managed computer node can include a communication interface 152 such as a management bus interface that is coupled to the communication bus 137.

The component that initiates a communication on a bus is referred to as a "master" component and the component to which the initial communication is sent on the bus is referred to as a "slave" component. A master component therefore issues an initial command to or initially requests information from a slave component. Each slave component is addressed, and thus communicatively accessible to master components, by a particular slave address. Both master components and slave components are operable to transmit and receive communications over the communication bus 137. Buses and the associated functionality of master-slave communications are well-known to those skilled in the art, and therefore not discussed in further detail herein.

Each of the managed computer nodes 140-1, 140-2, ..., and 140-N by itself can be a independent computer system include a CPU 142, a memory 144, etc. In certain embodiments, a computer node 140-N can also include an optional satellite management controller (SMC) 148, one or more sensors 146, and a communication interface 152. The SMC 148 and the sensors 146 are in communication with the BMC 120. The SMC 148 receives IPMB messages from the BMC 120 and perform certain management functions on the computer node 140-N. The SMC 148 can monitor the operation, performance, and health of the managed computer node 140-N.

For example, like many electrical components, the CPU 142 dissipates heat while operating. As such, a CPU fan (not shown in FIG. 1) can be used to cool off the CPU 142 after the CPU 142 reaches a prescribed temperature. Such a determination, i.e., whether the CPU 142 exceeds a prescribed temperature, can be made by the assisting management instance 132. As described above, the assisting management instance 132, through the communication interfaces 136 coupled with the communication buses 137, with the CPU temperature sensor 146 and the CPU fan to provide monitoring functionality over the temperature sensor and control functionality over the CPU fan.

In general, the assisting management instance 132 monitors operation, performance, and health-related aspects associated with the managed computer node 140, such as the temperature of one or more components of the managed computer node 140, speed of rotational components (e.g., spindle motor, CPU Fan, etc.) within the system, the voltage across or applied to one or more components within the managed computer node 140, and the available or used capacity of memory devices within the managed computer node 140. The assisting management instance 132 is communicatively connected to the one or more components through the communication interface 136 and the communication bus 137. In one example, the first assisting management instance 132-1 communicates with a first managed device 146-1 of the first managed computer node 140-1 and that is coupled to the first communication bus 137-1. In one embodiment, these components include sensor devices 146 for measuring various operating and performance-related parameters within the managed computer node 140. The sensor devices 146 may be either hardware or software based components configured or programmed to measure or detect one or more of the various operating and performance-related parameters. The assisting management instance 132 may receive this information sensed by the sensors 146 via the communication bus 137 for analysis, and more particularly, for determination as to whether an "event" is occurring within the managed computer node 140.

The communication bus 137 is used by the BMC 120 to request and/or receive various operating and performance-related parameters from one or more of the plurality of the managed computer nodes, which are also communicatively connected to the communication bus 137. In certain embodiments, optionally the SMC 148 can also be in communication with the CPU temperature sensor 146 and the CPU fan. The communication bus 137 may include components other than those explicitly shown in FIG. 1. Exemplary components not shown in FIG. 1 may include, without limitation, tachometers, heat sensors, voltage meters, amp meters, and digital and analog sensors. In one embodiment, the communication bus 137 is an Inter-Integrated Circuit ($I^2C$) bus. In another embodiment, the communication bus 137 is a System Management Bus (SMBus). In a further embodiment, the communication bus 137 is a Low Pin Count (LPC) bus. In certain embodiments, the assisting management instance 132 and the managed computer nodes 140 do not use IPMB to communicate with each other. In one example, the communication bus 137-1 and the communication bus 137-2 use different protocols. In another example, those two communication buses each do not use IPMB protocols.

Firmware may be utilized in the management device 120 that adheres to the Intelligent Platform Management Interface (IPMI) industry standard for system monitoring and event recovery. The IPMI standard is well-known to those of ordinary skill in the industry, and therefore not described in detail herein. Rather, the IPMI Specification, version 2.0 rev. 1.0, published on Feb. 12, 2004 and Revised on Jun. 12, 2009, is incorporated herein by reference.

In one example, the first assisting management instance 140-1 receives the data for constructing an IPMB message from the master management instance 130, and determines a request to a managed device such as the sensor 146-1 based on an indication in the data. The first assisting management instance 132 then sends the request to the managed device 146-1 through the first communication interface 136-1 and the first communication bus 137-1. The first managed device 146-1 sends response to the first assisting management instance 132-1.

In certain embodiments, the BMC 120 has a network interface controller 122 assigned with a network address. The firmware 121 is in communication with the computer nodes 140. The firmware 121 receives, through the same network interface controller 122, management requests 102 each for performing a management operation at one of the computer nodes 140 and addressed to the same network address. The management requests are directed to at least two of the computer nodes 140. The firmware can provide a single out-of-band communication port or access for communicating with all of the computer nodes 140. In other words, all out-of-band communication directed to the computer nodes can be forwarded by the same network controller 122 to the firmware 121. The out-of-band communication can be implemented by using network packets directed to the same (e.g. a single) network address of the network interface controller 122. Thus, the firmware allows all out-of-band communication messages 102 directed to any or all of the computer nodes 140 to be addressed to the same network address and handled by the same network interface controller 122.

In certain embodiments, each of the management requests includes data for constructing a protocol message in accordance with a selected communication protocol, as long as the communication protocol is capable of directing communication among the computer nodes. In other words, the firmware 121 utilizes the format of the messages of the communication protocol to implement a communication mechanism among the components (such as the management instances 130, 132) of the firmware. Further, the firmware 121 can utilize the address mechanism of the communication protocol to identify each of the managed computer nodes 140. The protocol message can also be utilized to include a management command, which can indicate an action or operation to be applied to a selected computer node 140. In certain embodiments, after receiving a management request including a message in accordance with the communication protocol, the master management instance can determine, based on the format and content of the message, the management action or operation and which of the managed computer nodes that the action or operation should be applied to. The communication protocols that can be utilized by the firmware 121 include IPMB, ICMB, I²C, System Management Bus, etc.

In certain embodiments, the firmware 121 can determine a target computer node from the computer nodes 140 based on a protocol address (e.g., IPMB address) in accordance with the communication protocol and included in the protocol message. The firmware can associate each of the computer nodes with a respective protocol address in accordance with the communication protocol, maintain a record of the association of the protocol addresses and the computer nodes 140, and determine the target computer node by examining the record with a given protocol address.

In certain embodiments, the master management instance 130 provides, to a device communicating with the master management instance 130, an emulated IPMB communication among the master management instance 130 and the assisting management instances 132. From the remote computer 108 or the management computer 109's point of view, the master management instance 130 represents a first BMC ("master" BMC) and each of the assisting management instance 132 is another BMC ("slave" BMC) or an intelligent platform management controller connected with the master BMC through IPMB. The remote computer 108 or the management computer 109 can send an IPMI bridged request to the master management instance 130, which in turn transmits the IPMB message encapsulated in the IPMI request to the assisting management instance 132 as indicated in the bridging request. For example, the remote computer 108 can construct an IPMI message with a command set as Send Message. The IPMI message includes data for the IPMB message that is to be sent to a selected one of the assisting management instances 132. The data for the IPMB message includes the responder's (i.e., the selected assisting management instance's) slave address. From the remote computer 108's point of view, it perceives the master management instance 130 and the assisting management instances 132 as master and slave BMCs (or other IPMI controllers) connected with each other through an IPMB bus. The master management instance 130 and the assisting management instances 132 each are assigned an IPMB slave address. In one example, the first assisting management instance 132-1 is identified by the first IPMB slave address. The second assistant management instance 132-2 is identified by a second IPMB slave address. The first and the second slave addresses are different.

In certain embodiments, the remote computer 108 only has the network address (e.g., IP address) of the master BMC (i.e., the master management instance 130). In one example, the first and second assisting management instances 132-1, 132-2 do not have a network address assigned specifically for them, respectively. The remote computer 108 embeds the data for the IPMB message in an IPMI message and then encapsulate the IPMI message in network packets (e.g., IP packets) addressed to the master BMC 130. The IPMI message includes indications that the embedded IPMB data is to be transferred to another selected BMC. The remote computer 108 can obtain the slave addresses of the slave BMCs 132, which are in accordance with IPMB, through various mechanisms. Thus, the remote computer 108 can include the slave address of the responder slave BMC in the IPMI message constructed. In one example, the IPMI message is encapsulated in at least one network packet having a network address associated with the master management instance 130. The master management instance 130 receives the network packet through the network interface 126 and then retrieves the IPMI message from the network packet.

In certain embodiments, when the firmware is executed by the processor 127, the processor 127 spawns at least one master management instance 130 and N assisting management instances, 132-1, 132-2, . . . , and 132-N, one for each of the plurality of the managed computer nodes 140-1, 140-2, . . . , and 140-N. For example, the first assisting management instance 132-1 corresponds to the first managed computer node 140-1. The second assisting management instance 132-2 corresponds to the second managed computer node 140-2. The N-th instance 132-N corresponds to the N-th managed computer node 140-N.

In certain embodiments, the master management instance 130 initiates a specified number of assisting management instances 132-1, 132-2, . . . , and 132-N, and the number can be configured in a configuration file. In certain embodiments, the master management instance 130 can dynamically discover the number of the computer nodes 140 in the system (e.g., the number of computer boards plugged in the backplane) and initiates the same number of assisting management instances 132. In certain embodiments, the master management instance 130 assigns a slave address to itself and each of the assisting management instances 132. The format of the slave addresses is compliant with IPMB. In certain embodiments, the slave addresses are assigned to the management instances 130, 132 utilizing other known mechanisms. The master management instance 130 keeps a record, for example in a table, of the correlation of the assisting management instances 132 and the assigned slave addresses. In certain embodiments, the master management instance 130 publishes the slave addresses to the remote computer 108 such that the remote computer 108 perceives that a slave BMC 132 managing a respective computer node 140 is assigned a respective slave address on a IPMB bus; an IPMB request can be sent to that slave address to communicate with the slave BMC. The remote computer 108 can also obtain the assigned slave addresses of the perceived master BMC 130 and the slave BMCs 132 through other known mechanisms.

As the remote computer 108 perceives that the assisting management instances 132 as slave BMCs connected with the master BMC 130, the remote computer 108, when desires to communicate with a slave BMC 132 managing a particular computer node 140, will embed data for constructing IPMB messages, including that slave BMC's assigned slave address and the target LUN, in an IPMI message. Upon receiving the IPMI message encapsulated in network packets from the remote computer 108 through the network interface, the master management instance 130 retrieves the IPMI message from the network packets and the examines the fields of the IPMI message. For example, when the master management instance 130 detects that the command field is set as Send Message and that the channel number is 0, the master management instance 130 determines that the IPMI message is to be bridged to an assisting management instance 132. The master management instance 130 then retrieves the payload data, which was set by the remote computer 108 for a BMC to construct an IPMB message, from the IPMI message.

In certain embodiments, the master management instance 130 and the assisting management instances 132 are executed by the processor 127 and running on different processes initiated by the processor 127. The master management instance 130 and the assisting management instances 132 implement predefined functions that are known to each other for communication. The master management instance 130 and the assisting management instances 132 utilize inter-process communication mechanisms such as pipe, shared memory, or message queue. In one example, the master management instance 130, the first assisting management instance 132-1, and the second assisting management instance 132-2 each run on a respective different process.

The master management instance 130 can generate a unique sequence number, as a tracking ID, for a received Send Message request. The master management instance 130 can also implement a "Pending Bridge Response" table to record the sequence number and information for identifying remote computer 108 that sent the Send Message request. The master management instance 130 calls a function of the assisting management instance 132 to pass the IPMB message data as well as the generated sequence number. The IPMB message data can include the target LUN number, which indicates a device 146 of the management computer node 140, and the command, which indicates an action to be applied to the identified device 146. For example, the LUN can indicate a temperature sensor and the command can be "Get Sensor Reading" or "Get Device ID." Alternatively, the master management instance 130 can actually construct an IPMB message with the data and sequence number, and calls a function of the assisting management instance 132 to transfer the IPMB message. The assisting management instance 132 receives the message data and the sequence number or the actual IPMB message, and then retrieves the fields from the data. For example, the assisting management instance 132 can use the LUN to identify a target device and applies an action in accordance with the command. In the above example, the assisting management instance 132 can communicate through the communication interface 136 with the identified temperature sensor 146 of the managed computer node 140 and retrieves the temperature reading or the device ID from the temperature sensor 146. Upon collecting the information requested, the assisting management instance 132 then sends information and the same sequence number back to the master management instance. Alternatively, the assisting management instance 132 can construct an IPMB response message, including the requested information and the same sequence number, and calls a function of the master management instance 130 to pass the IPMB response message. The master management instance 130 receives the requested information and the sequence number, for example through the IPMB response message, and can lookup the information of the requester (e.g. the remote computer 108) in the "Pending Bridge Response" table based on the sequence number. After, the master management instance 130 can construct an IPMI response message and encapsulate the response message in a transport format of the requester based on the information found in the Pending Bridge Response Table. In this example, the master management instance 130 will encapsulate the IPMI response message in network packets and transmit the network packets to the remote computer 108 through the network interface 122.

As an illustrative example, the master management instance 130 can perform following functions:

(1) receiving an IPMI message 102 from a remote computer 108 to bridge an IPMB request to an assisting management instance 132-1 managing a computer node 140-1 through the NIC 122;

(2) looking up in a table to identify the particular target assisting management instance 132-1 to which the IPMB message is addressed, based on the responders slave address indicated in the IPMI message;

(3) constructing an IPMB request message containing the data from the IPMI message and passes IPMB request message to the target assisting management instance;

(4) receiving an IPMB response message, containing the information requested by the remote computer, from the target assisting management instance; and (5) constructing an IPMI response message, containing the information requested by the remote computer, and transmitting the IPMI response message to the remote computer through an appropriate message interface 121, 126.

In certain embodiments, certain functions described above as implemented by the assisting management instances 132 can be implemented in addition or alternatively by the master management instance 130. For example, the master management instance 130 can also monitor operating and performance-related parameters of the managed computer nodes 140-1, 140-2, . . . , and 140-N received from the assisting management instances 132-1, 132-2, . . . , and 132-N. The master management instance 130 can determine whether an "event" is occurring within a particular computer node. For example, with respect to the configuration shown in FIG. 1, the master management instance 130 can monitor operation of a CPU 142-2 of the second managed computer node 140-2 by request, from the assisting management instance, information of a CPU temperature sensor (not shown in FIG. 1) of the sensors 146-2 and a CPU fan (not shown in FIG. 1). The requested information can be used to determine whether certain operating or performance related parameters exceed or fall below prescribed threshold ranges of operation. An example of such an event may be the temperature reading of heat dissipated by the CPU 142-2 reaching in excess of 145 degrees Fahrenheit.

In another embodiment, the master management instance 130 may also control one or more of the managed computer nodes 140-1, 140-2, . . . , and 140-N in the computer management system 100 in response to the occurrence of an event. The master management instance 130 may initiate operation of the CPU fan upon determining that the temperature dissipated by the CPU 140 has reached 146 degrees Fahrenheit.

The network interface controller 122 is capable of connecting the management device 120 to a network of remote computers via a network 104. A remote computer 108 as shown in FIG. 1, may be a desktop computer, a server, a router, a network PC (personal computer), or a peer device or other common network node. Networked connections may include a local area network (LAN) or a wide area network (WAN). Such networking environments are commonplace in offices, enterprise-wide computer networks, intranets, and the Internet.

Figure 2:
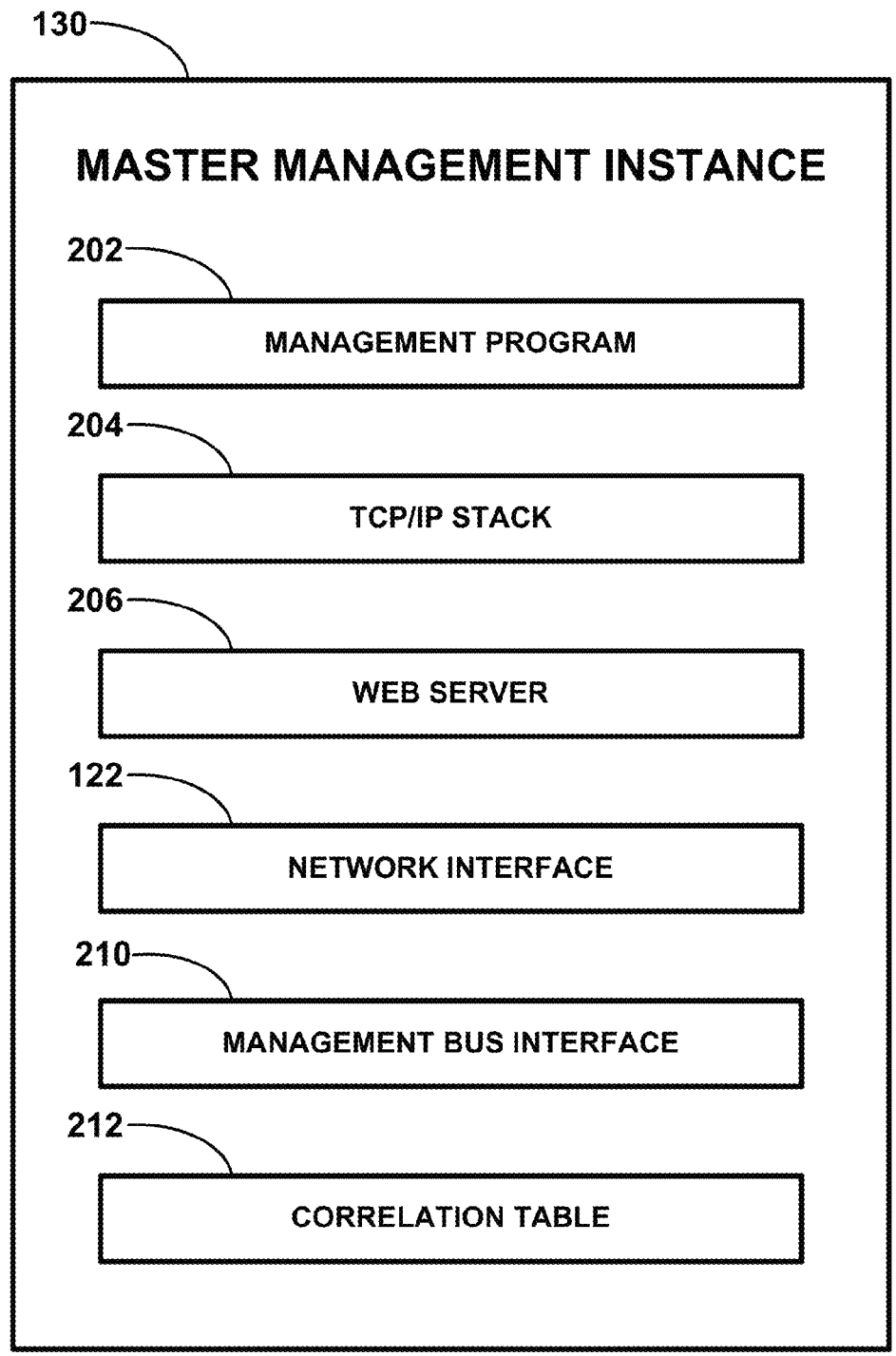
FIG. 2 shows a master instance of the management device according to one embodiment of the present disclosure.

Referring now to FIG. 2, in certain embodiments, the master management instance 130 includes one or more of the following:

(1) a network interface 122 configured to enable the BMC 120 to communicate with the remote computer 108 via a network connection;

(2) a TCP/IP stack 204 configured to enable the BMC 120 to communicate with the remote computer 108 through the network interface 122;

(3) a management program 202 configured to perform IPMI management functions;

(4) a web server 206 configured to enable web access from the remote computer 108 with the Internet 104;

(5) a communication interface 210, such as a management bus interface, configured to enable communication between the BMC and the plurality of the managed computer nodes 140-1, 140-2, . . . , and 140-N; and (6) a table 212 for recording correlation between slave addresses and assisting management instances 132.

In certain embodiments, by providing a web server application program 206, the master management instance 130 can receive and respond to requests to perform management function via a web interface. Further, according to certain embodiments, the BMC 120 only use one IP address to receive IPMI messages destined to all the managed computer nodes 140-1, 140-2, ..., and 140-N. In comparison, other implementations may require one IP addresses for each BMC managing a computer node. This can save significant cost and resource.

Figure 3:
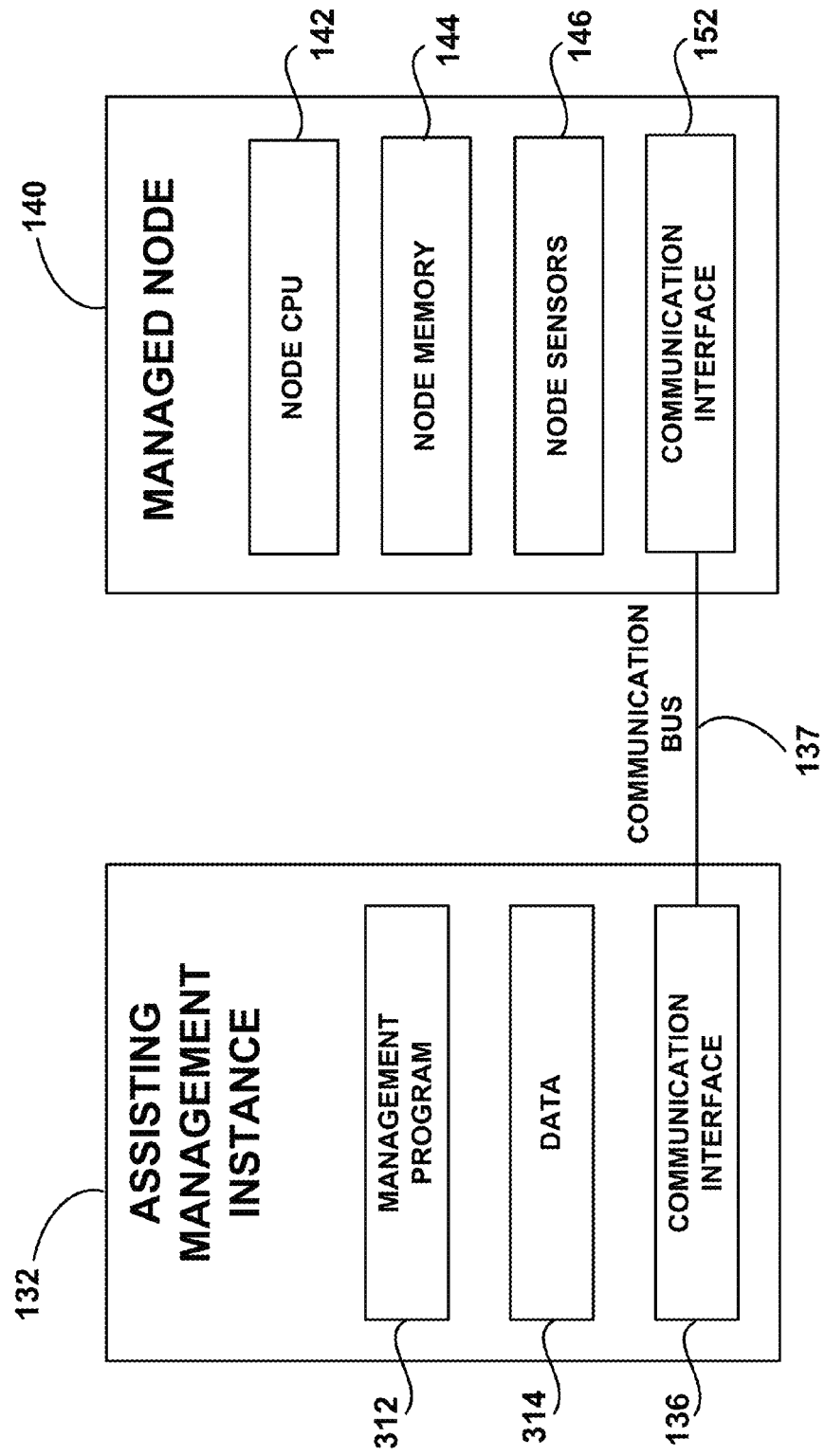
FIG. 3 shows an assisting management instance and a corresponding managed computer node according to one embodiment of the present disclosure.

Referring also now to FIG. 3, an assisting management instance 132 is shown according to certain embodiments of the present disclosure. Each assisting management instance 132 is initiated to manage one corresponding computer node 140. The assisting management instance 132 includes:

(1) a management program 312 configured to receive requests such as an IPMB request from the master management instance 130, to perform management function to a corresponding managed computer node 140, and to report the responses from the managed computer node 140 to the master management instance 130;

(2) a data storage 314 configured to store data collected from the corresponding managed computer node 140; and (3) a communication interface 136 configured to enable communication between the assisting management instance 132 and the corresponding managed computer node 140 over a communication bus 137.

The corresponding managed computer node 140 includes:

(1) an optional satellite management controller (SMC) 148 configured to collect data from the managed computer node 140, to perform certain management functions, and to send data and responses to the corresponding assisting management instance 132;

(2) a node CPU 142;

(3) a node memory 144; and (4) sensors 146 configured to monitor the health and performance related data of the computer node 140; and (5) a communication interface 152.

The assisting management instance 132 can control and collect information of sensors, sensor data record (SDR) devices, and field replaceable units (FRUs). The assisting management instance 132 can provide one or more of the following exemplary management functions:

(1) power up a node remotely for deployment;
(2) check a node's health condition remotely;
(3) power cycle a node remotely to bring up the cluster configuration after the OS has been deployed;
(4) monitor sensor readings remotely;
(5) monitor system event log (SEL) readings remotely;
(6) provide a remote text console (eliminates one out-of-band management fabric); and
(7) provide remote power management (power up, power down, and/or power cycle).

In certain embodiments, the managed computer nodes 140-1, 140-2, ..., and 140-N each further include one or more operating systems as well as one or more application programs. The operating system comprises a set of programs that control operations of managed computer nodes 140-1, 140-2, . . . , and 140-N, the management device 120 and allocation of resources. The set of programs, inclusive of certain utility programs, may also provide a graphical user interface to a user. An application program is software that runs on top of the operating system software and uses computer resources made available through the operating system to perform application specific tasks desired by the user. The operating system is operable to multitask, i.e., execute computing tasks in multiple threads, and thus may be any of the following: MICROSOFT CORPORATION's "WINDOWS 95," "WINDOWS CE," "WINDOWS 98," "WINDOWS 2000" or "WINDOWS NT" operating systems, IBM's OS/2 WARP, APPLE's MACINTOSH OSX operating system, LINUX, UNIX, etc.

Figure 4:
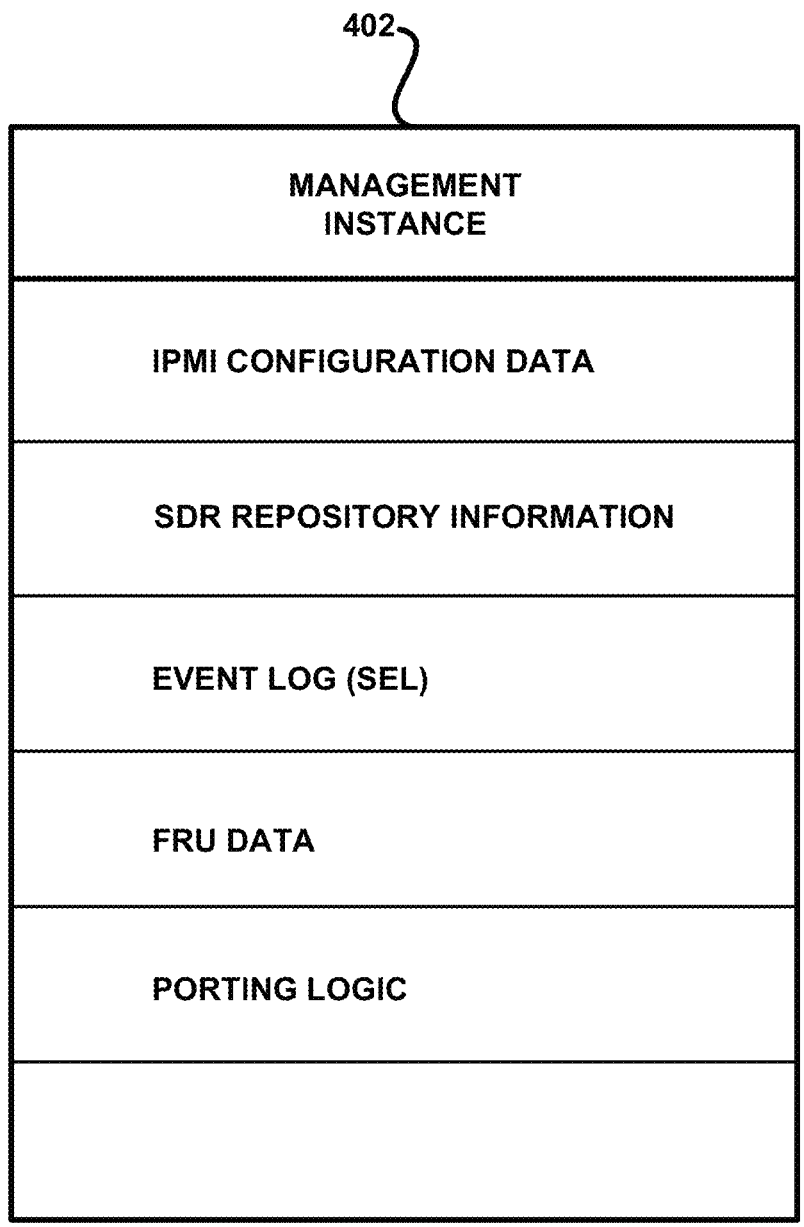
FIG. 4 illustrates data contents of a management instance according to one embodiment of the present disclosure.

In one embodiment, as shown in FIG. 4, the data storage 314 of the assisting management instance 132 stores configuration data, computer health data and/or control parameters collected by the sensors 146 of the managed computer node 140 for performing management functions. The configuration data, computer health data and/or control parameters include one or more of the following:

(1) IPMI configuration data;
(2) sensor data record repository (SDR) information;
(3) system event log (SEL) information;
(4) field replaceable unit (FRU) information; and
(5) porting logic information.

In certain embodiments, the remote computer 108 includes a web browser (not shown in FIG. 1), such as the INTERNET EXPLORER web browser from MICROSOFT CORPORATION of Redmond, Wash., that enables the remote computer 108 to communicate over the Internet, local area network (LAN), wide area network (WAN) 106 with the BMC 120.

Figure 5:
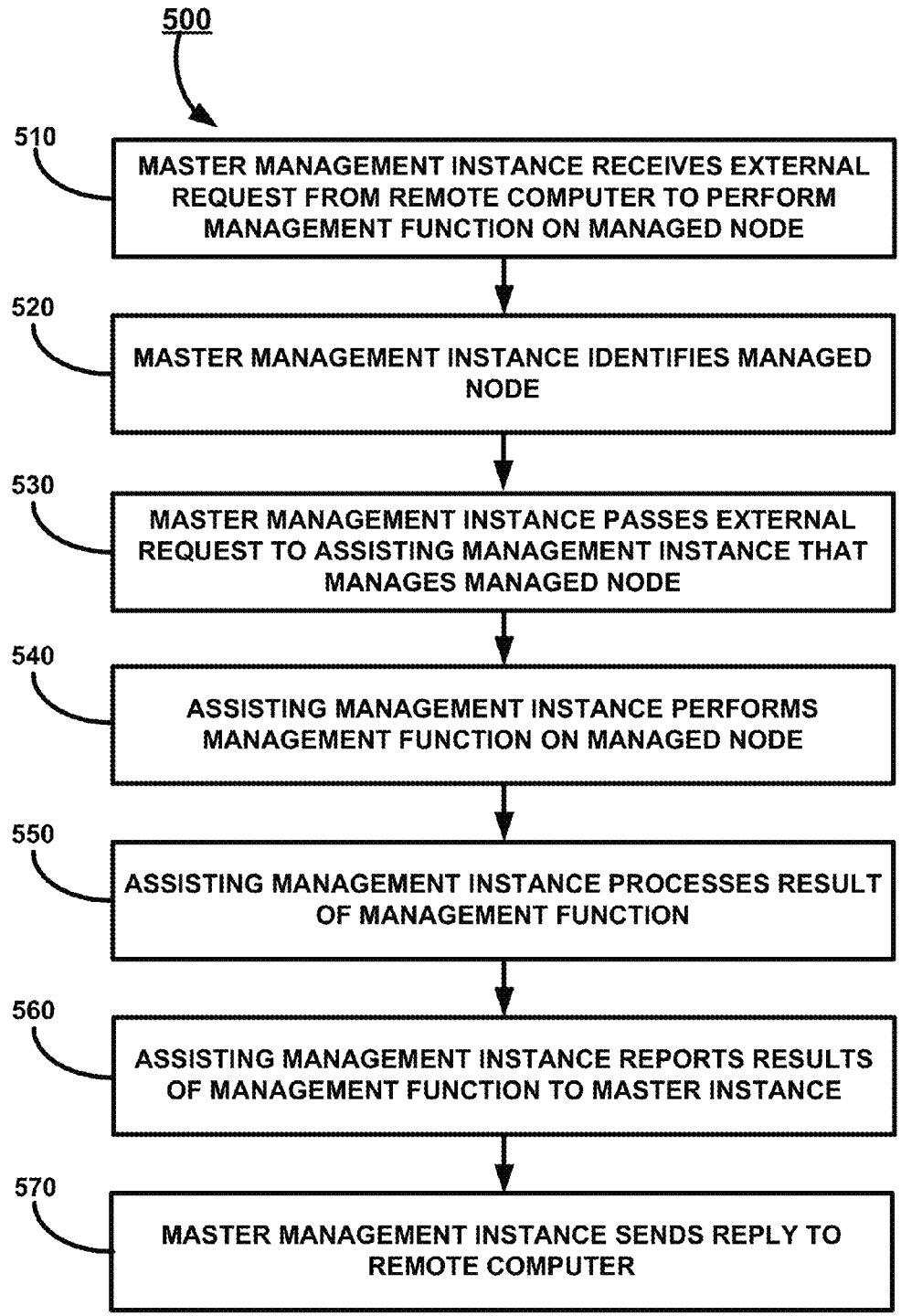
FIG. 5 shows an exemplary flow chart for the management device to perform a management function on a selected managed computer node according to one embodiment of the present disclosure.

FIG. 5 shows a flow chart of exemplary operations according to certain embodiments of the present disclosure. At operation 510: the management device 120 receives an IPMI request 102 from the remote computer 108, along with its task—getting the temperature of the CPU 142-2, and an indication of a target managed computer node 140-2. An exemplary IPMI request includes one or more of: the source IP/MAC address, the Responder's Address, the Network function code, the Responder's LUN, the Requester's Address, the Requester's LUN, the command, e.g., Send Message, and a message Channel number for example indicating IPMB, encapsulated data for IPMB request. The encapsulated data for IPMB request includes one or more of: the Responder's slave address, the Responder's LUN, the Requester's slave address, the Requester's LUN, the command, e.g., Get Sensor Reading, and the Sensor Number.

At operation 520, the master management instance 130 identifies the corresponding target managed computer node—140-2 based on the Responder's Address from a lookup table 212 that maps all the instances. Therefore, the second assisting management instance 132-2 of management firmware is responsible for perform the requested function on the second managed computer node 140-2.

When the master management instance 130 receives the Send Message command with the 'Bridged Request' parameter bit set, it checks for an available entry in a Pending Bridged Response table and copies parameters from the request to be bridged. When the response is received, these parameters will be used to validate that the response matches the earlier request and to reformat the response for the originating channel.

At operation 530, the master management instance 130 then forwards the encapsulated data for the IPMB request to the second assisting management instance 132-2 that corresponds to the second managed computer node 140-2 to process the request and perform the management function.

At operation 540, the second assisting management instance 132-2 communicates, through its corresponding communications interface 316, with the sensors 146-2 on the managed computer node 140-2, and to get temperature reading of the CPU 142-2 on the second managed computer node 140-2. The temperature of the CPU 142-2 is sent back to the second assisting management instance through the second communication interface 316 of the second instance 132-2 and over the communication bus 137.

At operation 550, the second assisting management instance 132-2 processes the results and responses of the management function, and stores the temperature of the CPU 142-2 the data storage 314.

At operation 560, the second assisting management instance 132-2 send the requested information, e.g., the sensor reading, to the master management instance 130.

At operation 570, the master management instance 130 uses the parameters of the original request stored at the master management instance 130, to reformat the response received from the assisting management instance 132-2 to be in compliance with the originating channel. For example, the master management instance 130 encapsulates an IPMI response message in network packets. The master management instance 130 then sends the network packets to the remote computer 108 through the network interface 126.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A baseboard management controller, comprising:
   a processor;
   a network interface controller assigned with a network address; and
   a memory having firmware being executable at the processor, wherein the firmware comprises:
      a master management instance in communication with the network interface controller; and
      a plurality of assisting management instances, each configured to be in communication with a respective one of a plurality of computer nodes, and to manage at least one health or performance related aspect of the respective one of the plurality of computer nodes;
      wherein the network interface controller is only in communication with the master management instance such that the firmware provides a single out-of-band communication port and access for communicating with all of the plurality of computer nodes through the network interface controller;
   wherein the master management instance, when executed at the processor, is configured to:
      receive, through the network interface controller, a plurality of management requests, wherein all of the management requests are addressed to the same network address of the network interface controller, and each of the managing requests is configured to perform a management operation at one of the plurality of computer nodes, the management requests being directed to at least two of the plurality of computer nodes.

2. The baseboard management controller of claim 1, wherein the firmware is configured to allow all out-of-band communication messages directed to the plurality of computer nodes to be addressed to the same network address and handled by the same network interface controller.

3. The baseboard management controller of claim 1, wherein each of the management requests includes data for constructing a protocol message in accordance with a first communication protocol, the protocol message including a management command, the first communication protocol being capable of directing communication among the plurality of computer nodes.

4. The baseboard management controller of claim 3, wherein each of the management requests is an Intelligent Platform Management Interface ("IPMI") message encapsulated in at least one network packet addressed to the network address; and
   wherein the firmware is configured to receive the network packet through the network interface controller and retrieve the IPMI message from the network packet.

5. The baseboard management controller of claim 3, wherein the firmware is configured to determine a target computer node from the plurality of computer nodes based on a first protocol address in accordance with the first communication protocol and included in the protocol message.

6. The baseboard management controller of claim 5, wherein the firmware is configured to associate each of the plurality of computer nodes with a respective protocol address in accordance with the first communication protocol, maintain a record of the association of the protocol addresses and the computer nodes, and determine the target computer node by examining the record with the first protocol address.

7. The baseboard management controller of claim 6, wherein the first communication protocol is Intelligent Platform Management Bus ("IPMB") protocol and, the protocol addresses are IPMB addresses.

8. The baseboard management controller of claim 3, wherein the master management instance is configured to determine, based on an indication included in a management request, a target computer node targeted by the management request from the plurality of computer nodes, and transfer the management request to an assisting management instance managing the target computer node.

9. The baseboard management controller of claim 8, wherein the firmware further comprises a message interface in communication with the network interface controller;
   wherein the master management instance is configured to
      receive an Intelligent Platform Management Interface ("IPMI") message from the message interface, the IPMI message containing first data for constructing an Intelligent Platform Management Bus ("IPMB") message, the first data including a first IPMB address;
      identify the target first assisting management instance from the assisting management instances based on the first IPMB slave address; and
      transfer the data to an assisting management instance selected from the plurality of the assisting management instance in accordance with the first data.

10. The baseboard management controller of claim 9, wherein each of the plurality of assisting management instances does not have a network address assigned specifically for that assisting management instance.

11. The baseboard management controller of claim 8, wherein each of the master management instance and the plurality of assisting management instance is configured to run on a respective different process.

12. The baseboard management controller of claim 11, wherein the master management instance communicates with each of the first and the second assisting management instances through inter-process communication mechanism.

13. A baseboard management controller (BMC) implemented method, comprising:
  executing, at a processor of the BMC, a program to be in communication with a plurality of computer nodes, wherein the BMC has a network interface controller assigned with a network address, and the program comprises:
    a master management instance in communication with the network interface controller; and
    a plurality of assisting management instances, each configured to be in communication with a respective one of a plurality of computer nodes, and to manage at least one health or performance related aspect of the respective one of the plurality of computer nodes;
    wherein the network interface controller is only in communication with the master management instance such that the firmware provides a single out-of-band communication port and access for communicating with all of the plurality of computer nodes through the network interface controller; and
  receiving, at the master management instance of the program and through the network interface controller of the BMC, a plurality of management requests, wherein all of the management requests are addressed to the same network address of the network interface controller, and each of the managing requests is configured to perform a management operation at one of the plurality of computer nodes, wherein the management requests are directed to at least two of the plurality of computer nodes.

14. The BMC implemented method of claim 13, comprising:
  receiving, at the program, all out-of-band communication messages directed to the plurality of computer nodes through network packets addressed to the same network address; and
  handling the network packets addressed to the same network address by the same network interface controller.

15. The BMC implemented method of claim 14, wherein each of the management requests includes data for constructing a protocol message in accordance with a first communication protocol, the protocol message including a management command, the first communication protocol being capable of directing communication among the plurality of computer nodes, wherein each of the management requests is an Intelligent Platform Management Interface ("IPMI") message encapsulated in at least one network packet addressed to the network address;
  the method comprising:
    receiving, at the program, the network packet through the network interface controller; and
    retrieving the IPMI message from the network packet.

16. The BMC implemented method of claim 14, comprising:
  associating each of the plurality of computer nodes with a respective protocol address in accordance with the first communication protocol;
  maintaining a record of the association of the protocol addresses and the computer nodes; and
  determining, at the program, a target computer node from the plurality of computer nodes based on a first protocol address in accordance with the first communication protocol and included in the protocol message as well as by examining the record with the first protocol address.

17. A non-transitory computer storage medium having computer-executable instructions stored thereon which, when executed by a processor of a baseboard management controller (BMC), cause the processor to:
  execute a program to be in communication with a plurality of computer nodes, wherein the BMC has a network interface controller assigned with a network address, and the program comprises:
    a master management instance in communication with the network interface controller; and
    a plurality of assisting management instances, each configured to be in communication with a respective one of a plurality of computer nodes, and to manage at least one health or performance related aspect of the respective one of the plurality of computer nodes;
    wherein the network interface controller is only in communication with the master management instance such that the firmware provides a single out-of-band communication port and access for communicating with all of the plurality of computer nodes through the network interface controller; and
  receive, at the master management instance of the program and through the network interface controller of the BMC, a plurality of management requests, wherein all of the management requests are addressed to the same network address of the network interface controller, and each of the managing requests is configured to perform a management operation at one of the plurality of computer nodes, wherein the management requests are directed to at least two of the plurality of computer nodes.

18. The non-transitory computer storage medium of claim 17, wherein each of the management requests includes data for constructing a protocol message in accordance with a first communication protocol, the protocol message including a management command, the first communication protocol being capable of directing communication among the plurality of computer nodes, wherein each of the management requests is an Intelligent Platform Management Interface ("IPMI") message encapsulated in at least one network packet addressed to the network address;
  wherein the instructions, when executed, cause the processor to:
    receive, at the program, the network packet through the network interface controller; and
    retrieve the IPMI message from the network packet.

19. The non-transitory computer storage medium of claim 17, wherein the instructions, when executed, cause the processor to:
  associate each of the plurality of computer nodes with a respective protocol address in accordance with the first communication protocol;
  maintain a record of the association of the protocol addresses and the computer nodes; and
  determine target computer node from the plurality of computer nodes based on a first protocol address in accordance with the first communication protocol and included in the protocol message as well as by examining the record with the first protocol address.

* * * * *